G. A. SCHIPPER.
GEAR CUTTING MACHINE.
APPLICATION FILED OCT. 7, 1914.
1,285,413.
Patented Nov. 19, 1918.
8 SHEETS—SHEET 1.
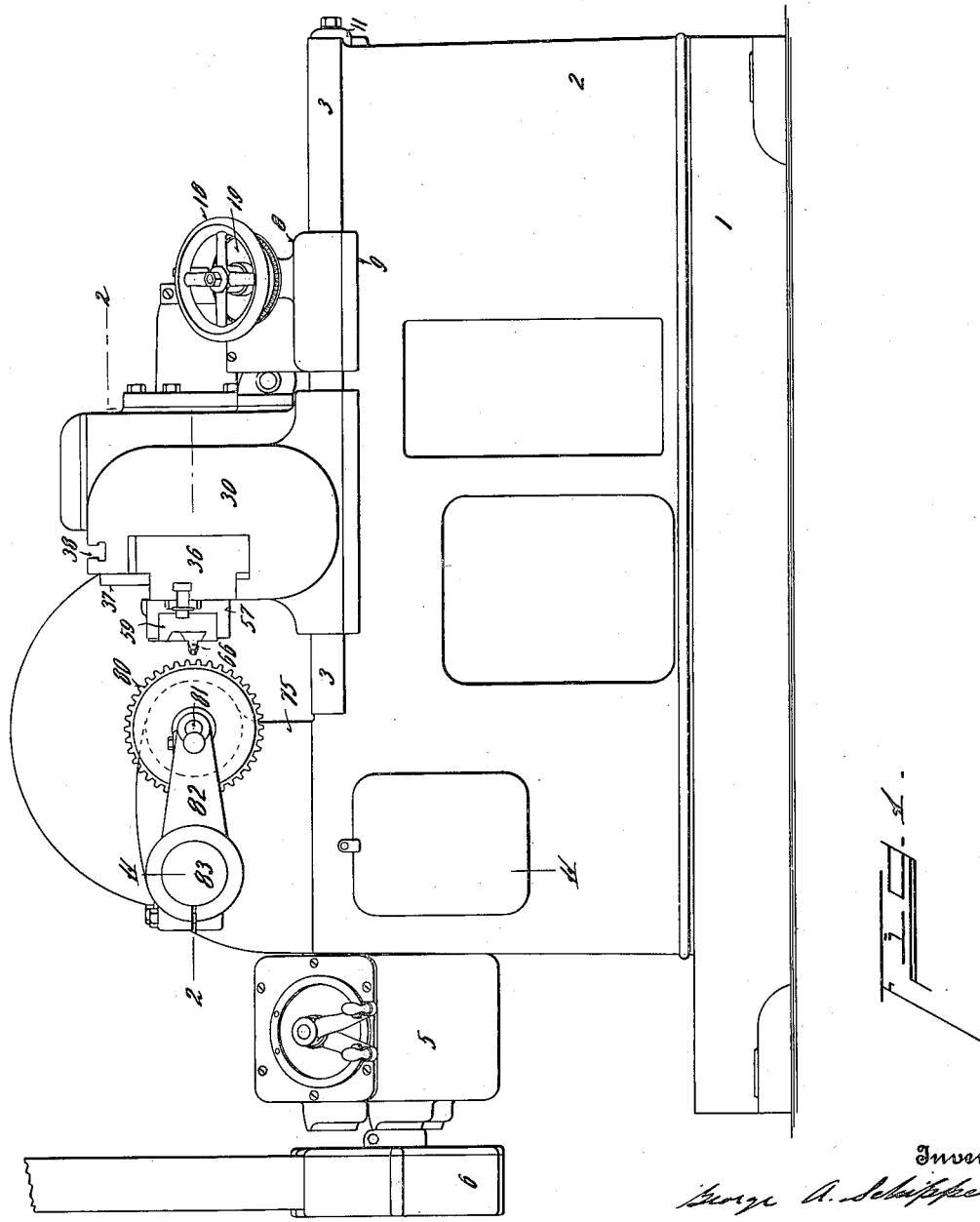
Witnesses
L. A. Beck
C. B. Foster
Inventor
George A. Schipper
By
Weaver Wood Attorneys

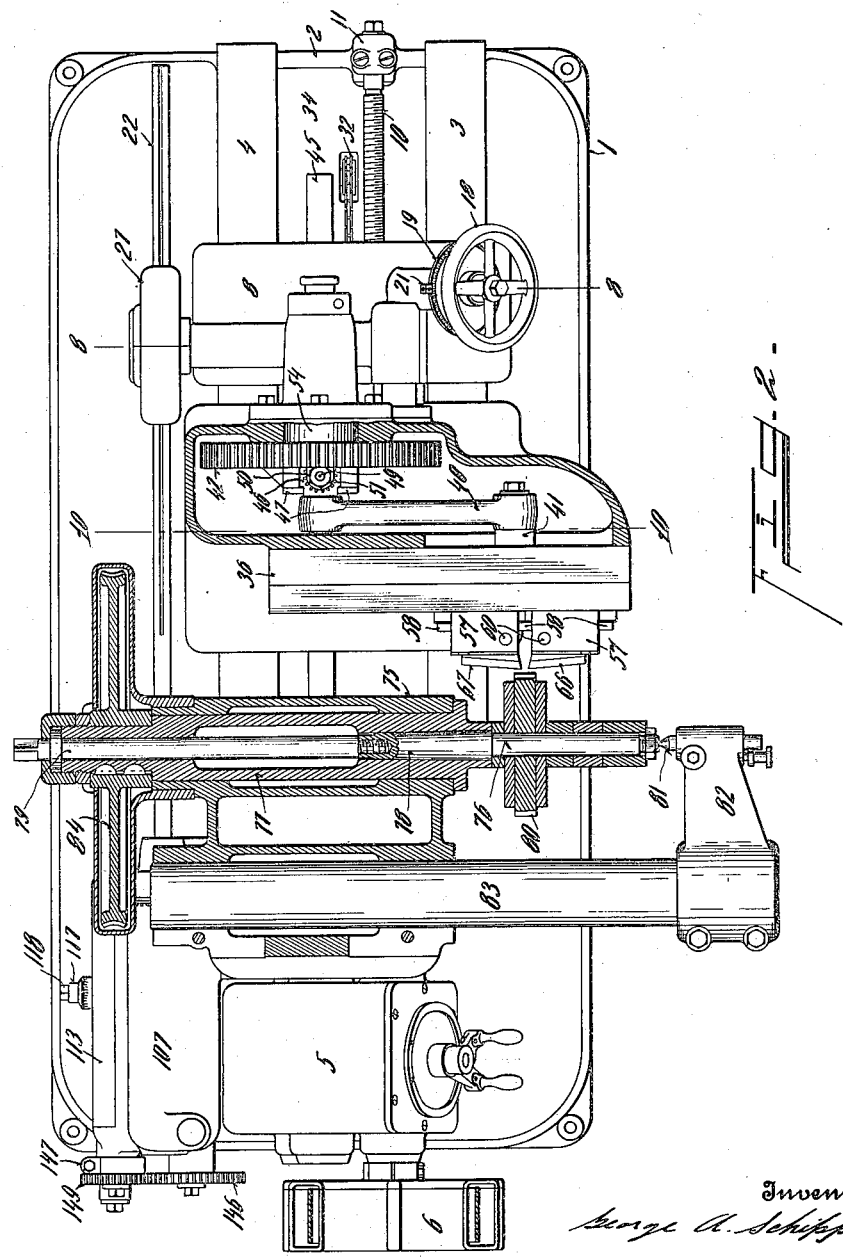

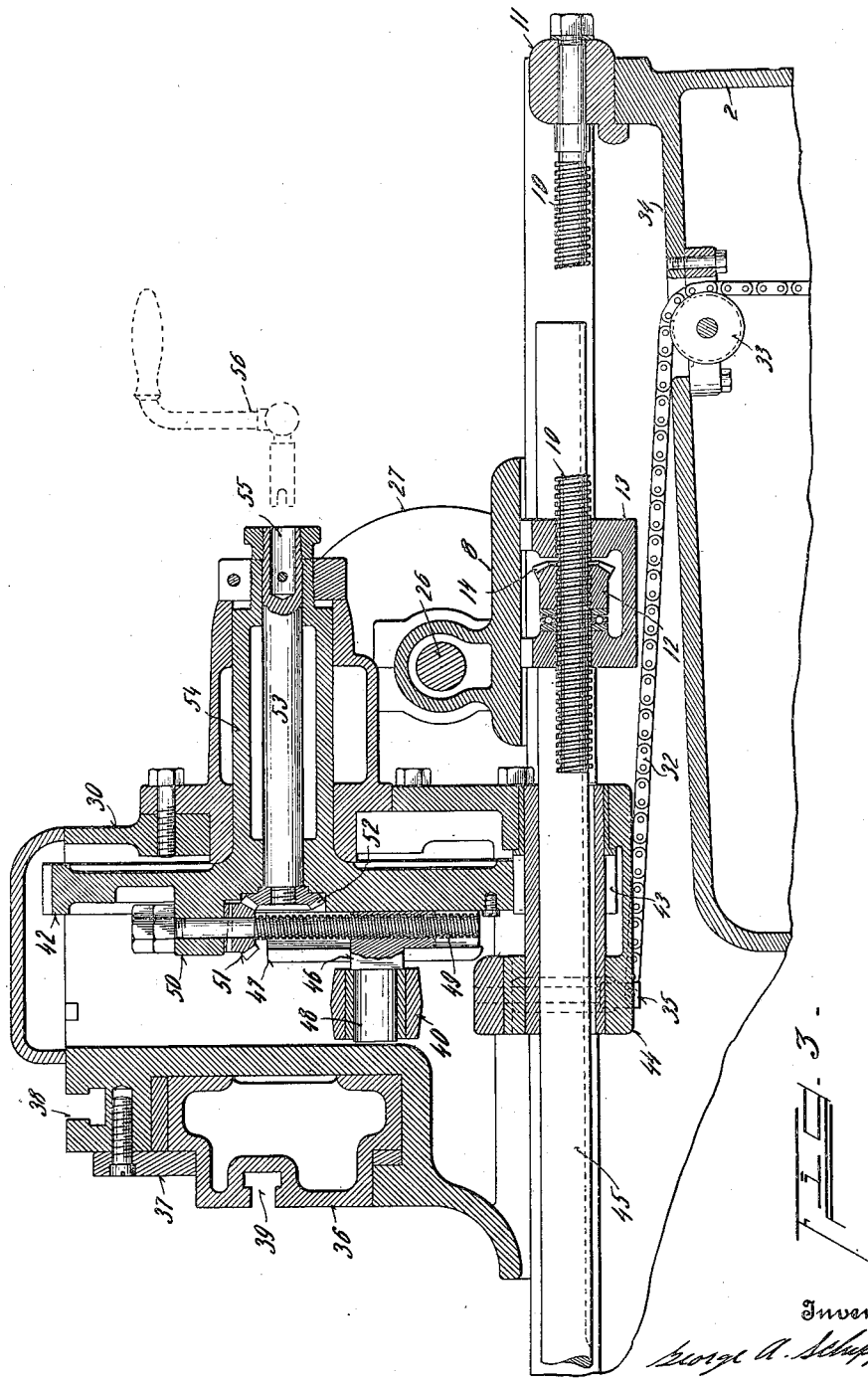

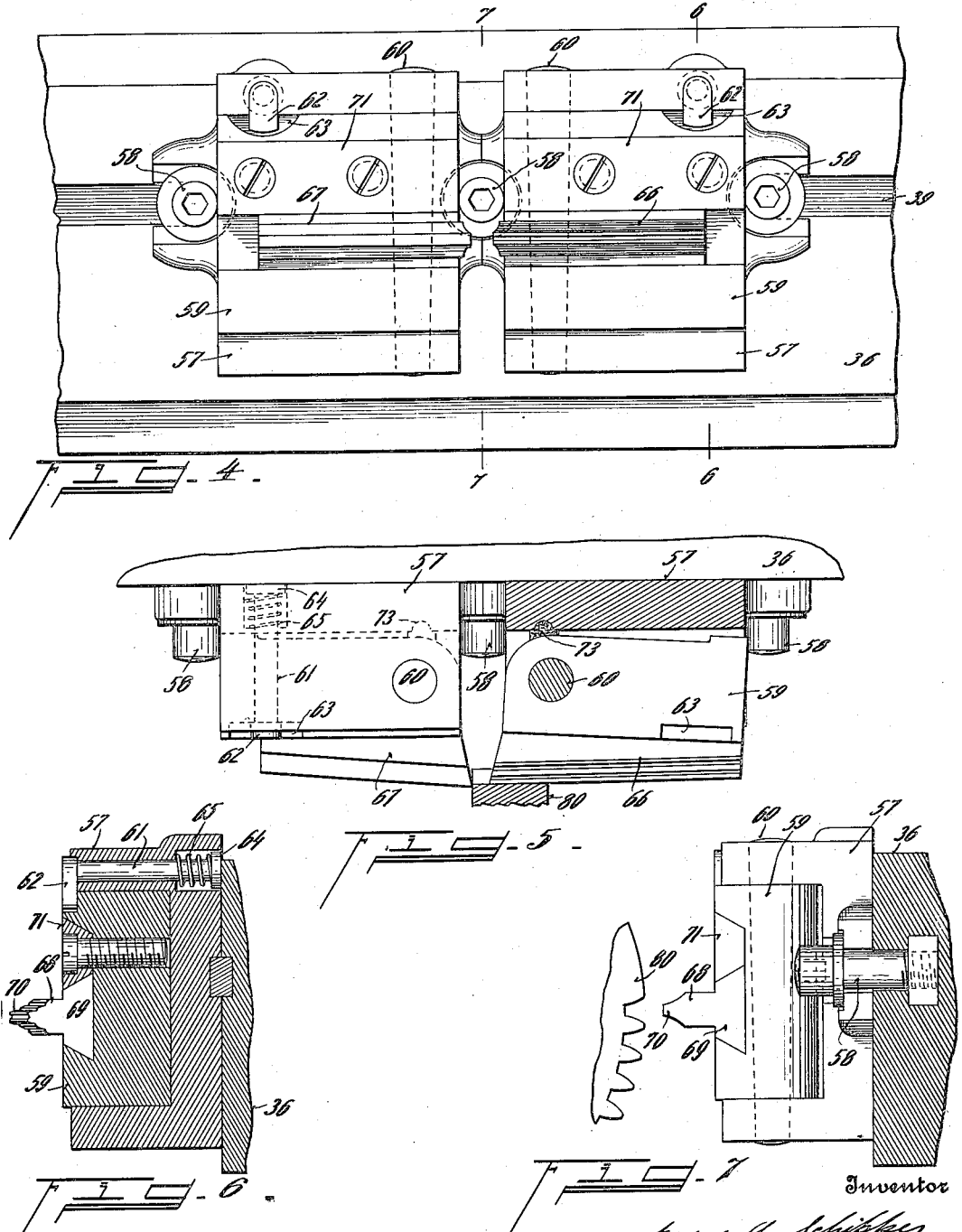

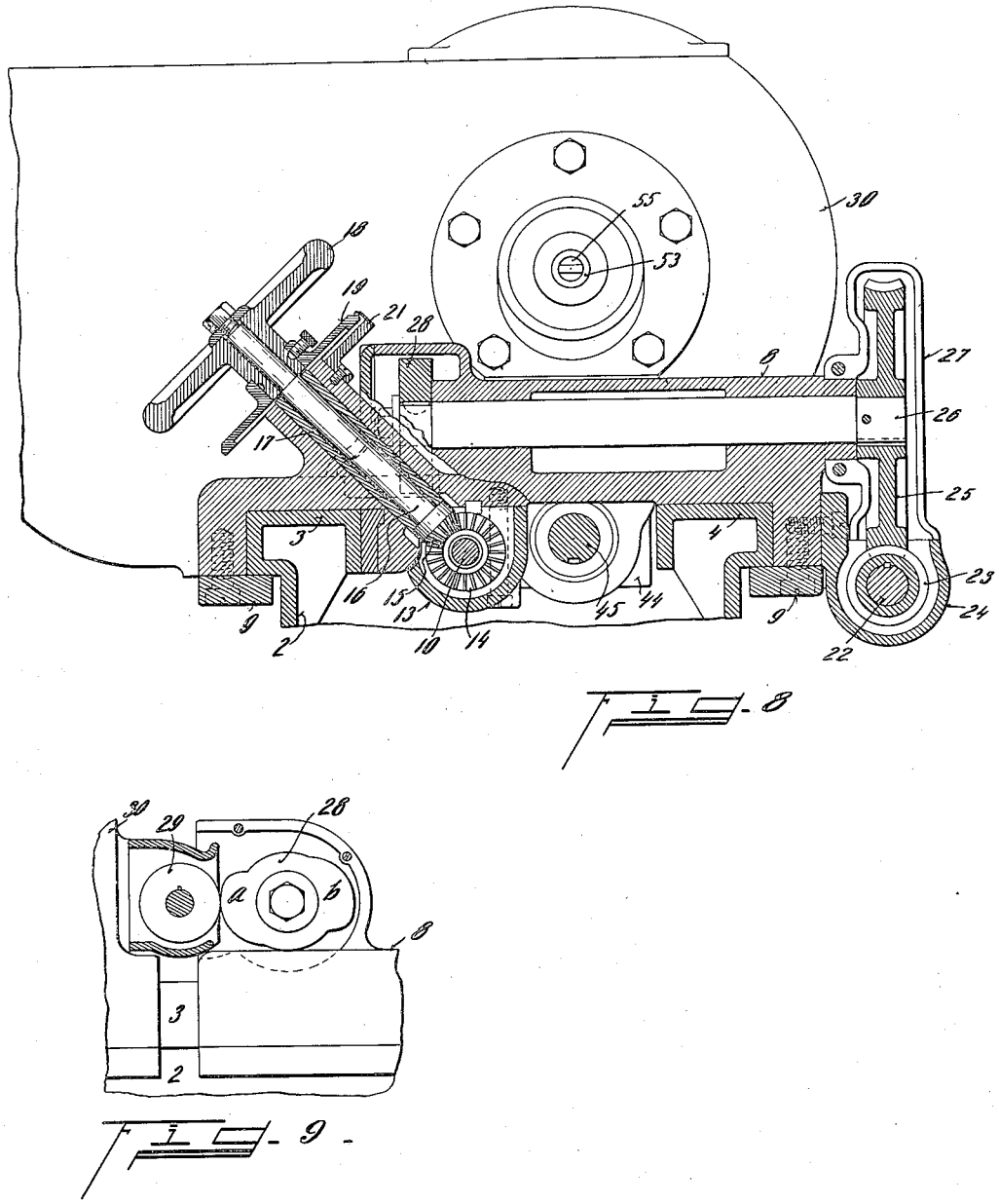

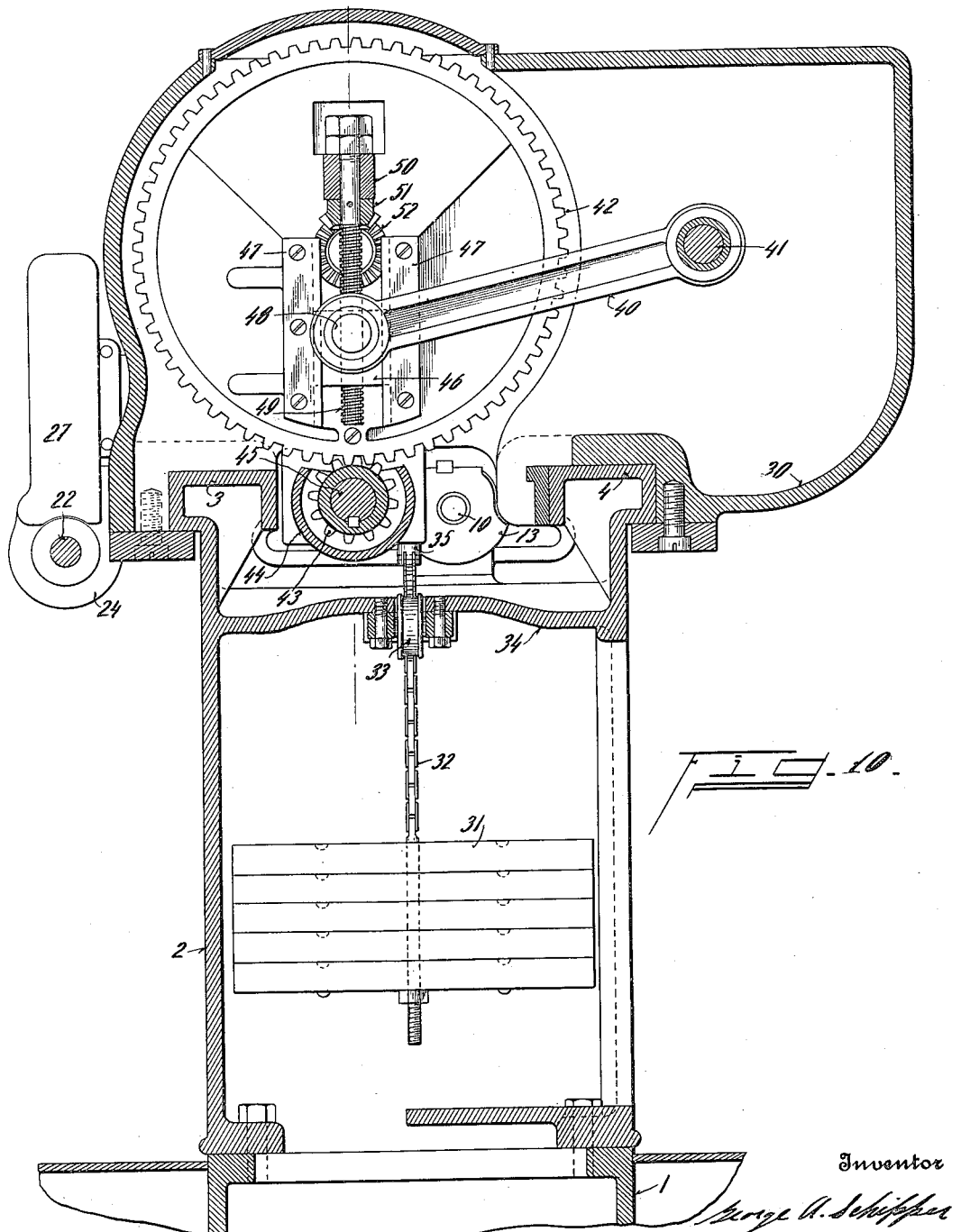

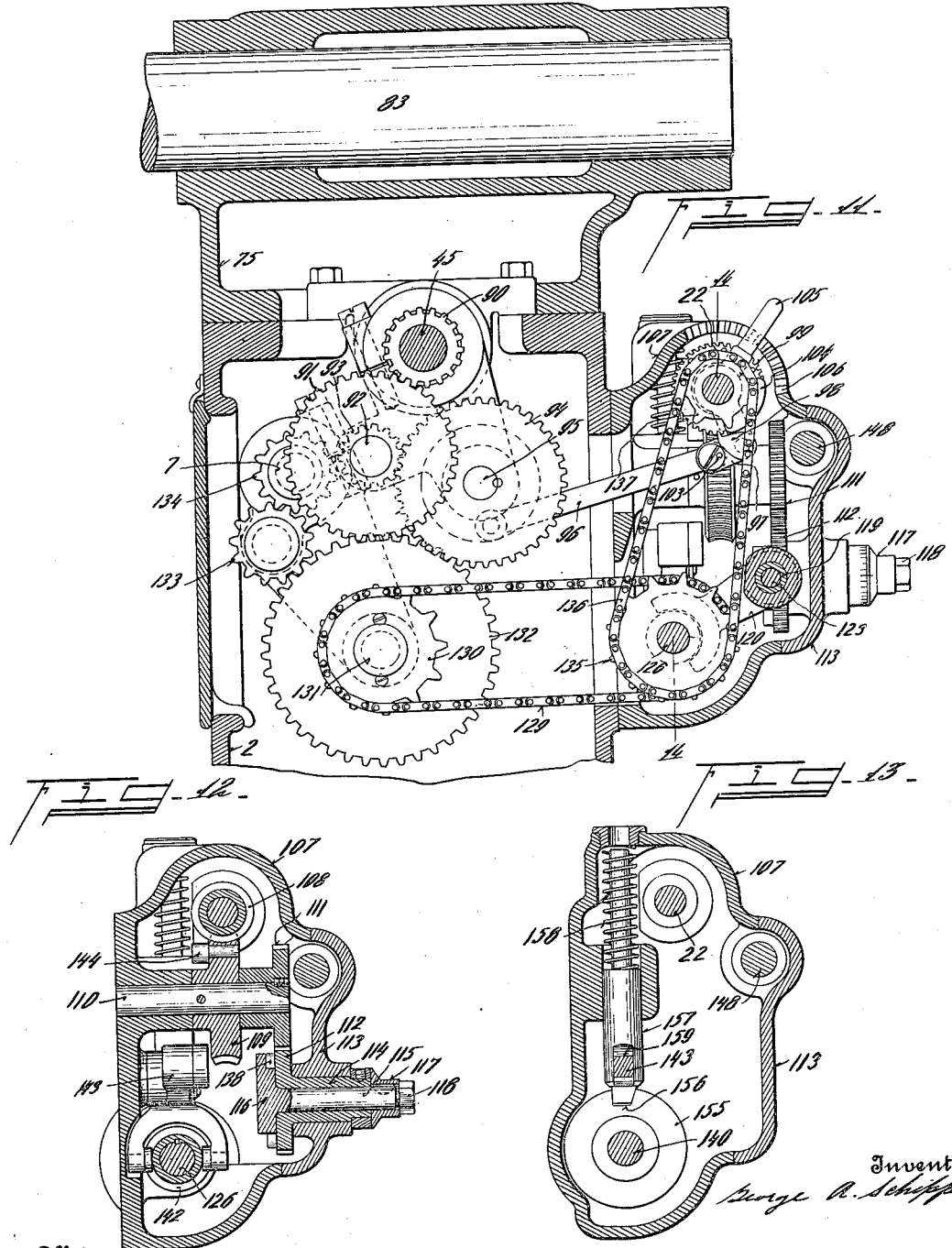

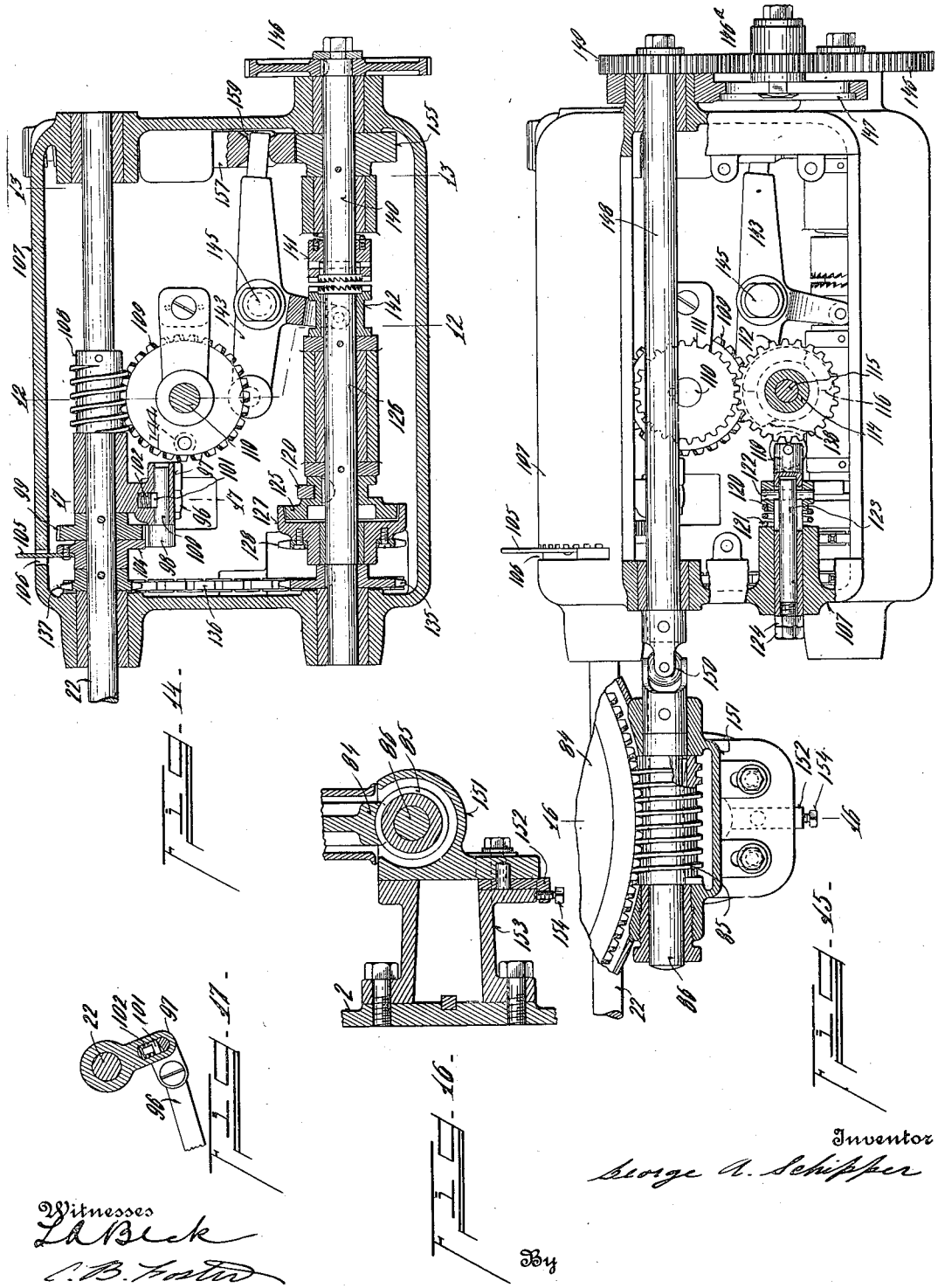

UNITED STATES PATENT OFFICE.

GEORGE A. SCHIPPER, OF AURORA, INDIANA, ASSIGNOR OF ONE-HALF TO GEORGE M. STEDMAN, OF AURORA, INDIANA.

GEAR-CUTTING MACHINE.

1,285,413.   Specification of Letters Patent.   Patented Nov. 19, 1918.

Application filed October 7, 1914. Serial No. 865,448.

*To all whom it may concern:*

Be it known that I, GEORGE A. SCHIPPER, a citizen of the United States, and residing at Aurora, in the county of Dearborn and State of Indiana, have invented a new and useful Gear-Cutting Machine, of which the following specification is a full disclosure.

My invention relates to a metal cutting machine tool contemplated primarily as a gear cutting machine. In such capacity its many advantages are more readily discernible. It is entirely automatic and very rapid in its performance, utilizing new methods of metal cutting in a measure due to novel form cutting tools, producing a cut gear geometrically accurate, and at a material reduction of time, resulting in a decrease of cost. Outside of all the mechanical achievements the cut surface finish is free from tool marks and highly polished.

An object of the invention relates to devices for supporting, actuating and feeding the cutting tools wherein the tool is reciprocated in a plane longitudinally parallel with the supporting axis of the work, with the stroke lengths and motion ratio variable to meet the demands of various metal cutting and degrees of cut. The cutting tool or tools are fed or translated intermittently in a work penetrating direction with the motions relatively in either variable or invariable degrees and coördinately to one of the tool reciprocating strokes, following with a rapid or accelerated motion to quickly retreat the tool toward its starting station.

Another object relates to a tool support or carriage translatable toward and from the work for determined metal cutting operations, and a follow unit or sub-carriage adjustable coincidently with the tool support for changing the station of said tool support, with the sub-carriage providing a support for the tool support translating means.

Another object of the invention relates to the tool support for securing the tool along its entire shank length and substantially parallel with the cutting plane or relative plane of tool support reciprocation. The tool preferably having its cutter outline or cross-sectional contour corresponding throughout its entire shank length, but in a relatively inclined or tapering degree from end to end to provide a relief rearwardly from the cutting edge end. This is particularly advantageous in making form tools, in grinding and sharpening and increases its life and durability and enables the tool to be rigidly clamped non-yielding to cutting strains for accurate and heavy cutting. Another object of the invention appertains to a plural number of cutting tools oppositely functioning in different sequence, kind and degree of work penetration, and wherein when the tools are mounted upon a reciprocating tool slide, one tool in one stroke may be utilized for rough cutting and a second tool in a converse stroke for finish cutting, approximately to the penetrating degree of advance of the tool to the work.

Another object relates to the employment of a rotative cam for controlling the forward or converse motions of the tool carriage, and likewise in conjunction with retrieving means coupled to the carriage for resistingly drawing the carriage or exerting a pressure counter to its motion toward the work, for an automatic functioning of the carriage motions in one direction, to retain its contact with the feeding cam, and also prevent abnormal tool encroachment into the work, causing chatter marks and similar defective surface finish.

Various other objects and features of the invention relates to the successful micrometric step rotations of the work supporting arbor, locking devices therefor, the various relative sequences in the feeding and speed ratios of the various elements and devices comprised in the machine herein, in an aspect of an automatic gear cutting machine, and in the construction of the various elements, and combinations thereof, all of which will be more fully disclosed in the description of the accompanying drawings, made a part hereof, and in such drawings like characters of reference denote corresponding parts throughout the several views, of which:—

Figure 1 is a side elevation of the machine.

Fig. 2 is a horizontal section taken on line 2—2, Fig. 1.

Fig. 3 is an enlarged central vertical section through the tool carriage.

Fig. 4 is an enlarged front elevation of a portion of the tool carriage and tool-holders upon their reciprocating slide.

Fig. 5 is a top plan view of Fig. 4, with a portion thereof shown in section.

Fig. 6 is a section on line 6—6, Fig. 4.

Fig. 7 is a section on line 7—7, Fig. 4.

Fig. 8 is a section on line 8—8, Fig. 2.

Fig. 9 is a detailed side view of the cam device for traversing or feeding the carriage.

Fig. 10 is a vertical section on line 10—10, Fig. 2.

Fig. 11 is a vertical section on line 11—11, Fig. 1.

Fig. 12 is a section on line 12—12, Fig. 14.

Fig. 13 is a section on line 13—13, Fig. 14.

Fig. 14 is a section on line 14—14, Fig. 11.

Fig. 15 is a detailed vertical section through the feed-box illustrating the transmission mechanism for the indexing devices.

Fig. 16 is a section on line 16—16, Fig. 15.

Fig. 17 is a section on line 17—17, Fig. 14.

The machine is shown as of horizontal type, which design offers stability and accessibility for a high power machine, which is a feature of structural advantage, and could be variously modified without a departure in principle. The cutting tools have a reciprocating motion with an intermittent feed toward the work, and an automatic quick or accelerated reverse feed to withdraw the cutting tools for a successive operation. The machine is primarily adapted as a gear cutting machine, and the description herein is confined to such use, but from a broader aspect it may be treated as a metal cutting tool as for slotting and grooving. As a gear cutting machine, its utility, metal cutting speed and accuracy possess marked advantages over machines used for like purposes hitherto known. In fact it may be safe to say that a gear can be cut in geometric accuracy, and in about one-third the time heretofore possible to cut gears. It is very simple in operation, and entirely automatic in its gear cutting performances, so that when the gear blanks are properly mounted, no further attention need be given until the gear is finished. It produces an absolutely finished product, even to a polishing effect of the gear teeth. Its rapid metal cutting performance is primarily due to the specific form of cutting tools employed, and likewise to a plural number mounted in an opposing relation and progressive in degree of cutting performances.

The description herein deals with the invention from a preferred point of view, employing the preferred type of cutting tools, and it is obvious that other forms may be used in either the singular or plural number operating in an opposing or coincident relation for other kinds of metal cutting.

Some of the devices employed herein may be variously modified to accomplish the same result, and, therefore, enlighten only from a generic aspect, to disclose an operative construction for progressively performing the various steps or operations progressively or sequentially occurring for automatically cutting a complete gear. Some of the devices shown and described closely follow recognized standards in the machine tool art. These offer a variety of modifications and perceptibly would not alter the functions and principles of this invention.

In this class of machines, a satisfactory lubricating system is an important factor to a successful continued operation of the machine, which includes the lubrication for the cutting tools, but as such systems have assumed an independent branch in the art, no elaboration will be made thereof herein further than to note that the lubricating requirements in the actual machine are complied with, including a copious supply to avoid heat and unnecessary expansion of the gear blank, and illustration of a lubricating system is herein omitted, except in so far as the structural design inherently qualifies in such capacity.

The main frame of the machine is of cabinet design, having a base portion 1, and a hollow body portion 2, which is used as a housing for some of the components of the machine. The upper surface of the body portion 2 has a pair of horizontal rails 3, 4, integrally formed therewith, upon which the tool holding carriage slides. The base 1 is utilized as an oil reservoir, and as a hopper or receiving trough for the chips or tailings. A single pulley drive is employed which transmits motion to a speed-box 5, for imparting various ratios of speed to the various driven branches to obtain the desired feed and speed results demanded in modern practice. The varying speed mechanism is of a gear type, and as its details of construction do not materially concern this invention, full illustration and description thereof have been herein omitted, for any of the various types of speed varying transmission devices may be employed. The drawings are complete in their illustration of a transmitting train from the main driving pulley inclosed within the casing 6 for driving the main shaft 7, and as the different speed results are not material to a complete understanding of the invention, their omission is preferred so as not to unduly encumber the specification, as one transmitting train is complete.

Tool holding carriage.

A compound arrangement of carriage devices, comprising two units, is employed. One, a stationed unit, translatable upon the bed for changing its proximity to the work, and the second, as a tool carrier unit, movable upon the bed unitarily coincidently with said stationed unit and independently in motions of reciprocation toward and from the work by propelling devices supported on the other in which a cam is the prime factor.

The non-reciprocating stationed unit (see Figs, 1, 2 and 8) comprises a frame structure 8 slidably mounted upon the rails 3 and 4, and spans said rails. It is provided at its base margins with the gibbed or clamping plates 9 embracing the underlying surface of the rails to slidably seat the frame upon the rails, and body of the machine, and confine the same against vertical or lateral movement. This frame structure is translated longitudinally upon the rails by screw devices comprising a screw rod 10, having one end thereof secured within a bearing block 11, fixed to the end wall or web of the machine body 2. The screw rod is engaged by a rotatable nut 12, confined between the cross-webbing of a hanger bearing-box 13 dependingly supported and fixed to the base of the frame structure 8 and to its underlying surface between the rails 3, 4, (see Figs. 3 and 8). The rotative nut has a bevel gear end 14, with its teeth in mesh with the bevel gear 15 fixed upon the shaft 16, journaled obliquely in the frame structure 8 concentrically within a bushing 17, which bushing is of a diameter equal to that of gear 15, for convenience in assembling the parts, and in concealing the bevel gear. A hand-wheel 18 is fixed to said shaft 16 for manually rotating the same, to feed the carriage units, said hand-wheel having a dial plate 19 fixed thereto for micrometer reading of carriage feed adjustment, with an index finger 21 fixed to the journal boss of the frame structure 8 from which the dial reading is taken. Thus, the carriage units may be longitudinally adjusted or fed upon the rails toward and from the work or headstock in any degree and with micrometer accuracy and precision.

The frame structure 8 serves as a support and journal for the motion imparting devices for reciprocating the tool holding carriage unit, which motion imparting devices comprise a shaft 22 parallel with and coextensive of the rails 3 and 4, said shaft being intermittently rotated during the feeding stroke of the tool-holder carriage unit and continuously rotated in a return or normalizing stroke. The transmission devices, therefore, will be hereinafter more fully described.

A worm pinion 23 is splined upon said feed shaft 22, and confined within the casing section 24 fixed to the frame structure 8, (see Fig. 8), so as to move therewith slidably upon shaft 22 in the translating movements of the non-reciprocating carriage unit. The worm pinion 23 meshes with a worm wheel 25 fixed upon a shaft 26, and at one end thereof said worm wheel being suitably inclosed within the casing 27.

The opposite end of said shaft 26 has a cam wheel 28 fixed thereto, its cam surface engaged with a roller 29 journaled within a bearing projection, housing said roller and extended from the frame 30 of the reciprocating carriage unit. Said frame 30 is slidably mounted and spans the rails 3 and 4, which mounting is substantially the same as that described for the non-reciprocating carriage unit. The reciprocating carriage unit is moved forward positively by the cam 28 and retracted by a weight 31, suspended from the chain 32, (see Fig. 10) within the machine body 2. The chain passes over a guide roller 33 journaled within a bearing-block fixed to the upper cross-web 34 of the machine body, and said chain connects at 35 with the lower portion of the reciprocating frame structure 30. The weight constantly maintains the cam roller in engagement with its cam to impart the predetermined movement in strokes of reciprocation with each rotation of the cam. The cam herein illustrated is of double form, imparting two reciprocating strokes at a predetermined traversing rate, with each cycle of the cam rotating shaft.

The direction of cam rotative motion is constant but varying as to its rate of speed in a tool feeding cycle. The cutting feed of the tool or its movement toward the work is at a predetermined proper metal cutting rate, and its retreating or return movement at an accelerated ratio to quickly move the cutting tool away from the work and accommodate for a work indexing interval, following in sequence to readjust the work for a successive cutting operation. The contour of each cam is also of such configuration as to possess a non-feeding period at both limits of tool feed. This in one instance permits the tools to be reciprocated idly across the work, polishing its cut surface, and in the second instance after a tool retreat to compensate for the time required for a successive shifting of the work.

The cams $a$ and $b$ are the duplicate of each other, and diametrically opposite each other, the cam contour of each comprising an eccentric surfaced portion representing the use of the cam for feeding the tool supporting carriage forward, graduating into a concentric surfaced portion, for a non-feeding working stroke of the tool, and terminating with an abrupt offset for the retreating carriage feed, following with a concentric portion for a non-feeding period during work shifting. The use of a plural number of cam surfaces is merely a factor for speed, increasing the number of tool feeding motions to a revolution of the cam shaft.

The cam feed has advantages in addition to the foregoing, especially in the use of the machine for cutting gear teeth, as, for instance, the degree of its control is predetermined to properly advance the tools coordinate to the cutting area of the tool, which to an extent may be here exemplified by referring to the preferred kind of cutter tool embodied herein. The tool is shaped to meet the design for a particular pitch and style of gear tooth, simultaneously finishing the opposite flanks of adjacent teeth. Thus the cutter in all respects resembles a tooth with its point or tip of the tooth initially engaging the blank presenting a minimum cutting area and its depth or cutting advance toward the work proportionate to the best engineering practice, and the advance for each stroke coördinate to the increase of cutting area so the safe maximum cut is had for each cutter stroke. Such variance in feed advance can be minutely predetermined by a cam justifying its employment in this invention. The same cam can be used for different sizes of gear teeth, or different depths of cut, from that of the maximum degree of throw, by adjusting the cam toward or from the work. This does not alter the constant feed stroke of the tool imparted by the cam, but merely lengthens or decreases the degree of non-work-penetrating tool feed. The dial plate 19 and index finger 21 comprise the calipering means for accurately adjusting the relative parts for controlling the degree of tool feed in each metal cutting cycle, to determine the depth of each complete cut.

*Tool support and reciprocation.*

This feature of the machine is somewhat analogous to a cutting tool of the shaper class, in which the tool is mounted upon a reciprocating ram, of crank operated type, in which the length of throw or stroke can be varied at will, but varies therefrom in that the tool is fed toward the work as well as reciprocated and is adjustably mounted upon a holder, which holder may also serve as a work holding table, enlarging the scope of the machine as a metal cutting tool. In its preferred use, however, as a gear cutting machine, the reciprocating carriage comprises a hollow frame 30, slidably mounted upon the rails 3, 4, with its forward face horizontally recessed, forming a gib-way for the transversely moving tool-slide or ram 36, retained within the carriage-way by a gib-plate 37, (see Fig. 3), the upper surface of the carriage frame being provided with a transverse anchorage groove 38 for securing brace arms or for other auxiliary purposes within the uses of the machine. The forward face of the reciprocating tool-holder slide or ram is also provided with an anchorage groove or T-slot 39 for securely mounting the tool-holders. The slide is reciprocated by a crank or pitman arm 40, housed within the frame 30, and pivotally connecting with the slide at 41, Fig. 2, while its opposite end is pivotally connected to an adjustable crank member slidably mounted upon the face of the crank gear 42, journaled within a tubular bearing member fixed to and projecting through the rear wall of the carriage frame. The crank gear 42 is in mesh with a gear 43 journaled in a bearing hanger 44 dependingly supported from the base of the frame 30 and splined upon a driving shaft 45, which shaft receives its motion from driving mechanism to be hereinafter described, and is coextensive of and between the rails 3, 4, to transmit motion to the tool-slide in any adjusted position of the reciprocating tool carriage. The forward face of the crank gear 42 in a diametric plane is provided with a guide-way to receive the crank block 46, which is retained thereon by the plates 47, overlapping the opposite sides of the crank block. The crank block has a crank pin or arm 48, transversely projected therefrom, and pivotally engaged with the pitman 40. The crank block 46 also qualifies as a nut and engages with the screw rod 49 diametrically journaled upon the crank gear within the bearing boss 50 integrally with and laterally projecting from said crank gear 42. The screw rod or shaft 49 is rotated by a miter gear 51 fixed thereon, meshing with a miter gear 52, fixed upon the shaft 53, concentrically journaled within the hub extension 54, of the crank gear. The free end of said shaft 53 has a crank receiving socket 55, into which a crank handle, say 56, may be engaged for rotating the shaft 53, either to the right or left to move the crank block toward and from the axis of the crank gear to change its throw.

*Tool and holder.*

Two special types of cutting tools for cutting gear teeth are herein provided in relative opposed arrangement to function alternately, one for producing a roughing cut, the second a finishing cut. The holder for each is mounted and clamped to the front face of the tool-slide 36 and comprises a bifurcated base member 57 secured to the face of the tool-slide by the T-bolts 58, entering the T-groove 39 for securely clamping the tool-holder in any adjusted position upon its slide. The base member 57 has a tool-block 59 pivotally mounted between the furcations thereof so as to swing upon the pivotal pin 60 to enable the tool to freely slide over the work in its return stroke, an operation common in reciprocating metal cutting tools. The fulcrum of the tool-block is located at one end, while its opposite end is yieldingly urged in one direction, namely that of swinging the cutting edge to a work engaging position at the end of its idle stroke. The tension mechanism, comprises a plunger 61, (see Fig. 6), slidable within a bore formed in the base member 57 and adjacent one longitudinal edge of the tool-block. The plunger is provided with an overhanging arm 62 engaging into a semi-circular recess 63 formed in the face of the tool-block. The opposite end of said plunger is provided with an annular flange or head 64 sliding within an enlarged bore of the base member and the head is engaged by a spring 65, thereby urging the free end of the tool block inwardly between the furcations of the base member when the cutting tool clears the work in a reverse or return stroke to position the tool for its cutting stroke.

As two tools are employed, a roughing and finishing, both preferably of different construction in so far as their cutting face is concerned, although both may be similar, but in the preferred form, 66 represents the roughing tool and 67 the finishing tool. Each of these tools has a shank portion 68 and a dove-tail base portion 69, and a cutter portion 70, the contour of which in cross section, in one instance, represents the finished gear cut between the teeth, and the second is longitudinally fluted, or of undulating or corrugated outline in cross-section to provide relief for the roughing tool. The tools longitudinally taper from one end toward the opposite end to guide the tool in its return stroke and relieve the same from any cutting action, but its cross-sectional cutting area is the same in outline throughout its length, and in its elongated character it is capable of long use, for it is ground at its cutting end rearwardly, and, therefore, has an advantage over other forms of cutting tools. The tool base is of dove-tail form, and clamped within a dove-tail way formed by grooving the face of the tool block and providing a removable insert piece 71, which securely clamps the tool to the block, and enables it to be longitudinally adjusted therein.

As the cam feed is of an intermittent character, progressing only in one stroke of the tool-slide, it will readily be seen that the tools are fed or advanced toward the work prior to the commencement of the roughing cut and the feed is dormant on the return stroke for the finishing tool, which is alternately active from its companion cutter.

The tool-block at its forward end in rear of its fulcrum engages with a felt padding 73, seated within the base member 57, which serves as friction means to retard the swinging action of the tool-block, so that its cutting edge will not be brought forcibly against the work to the injury thereof or to the tool.

The use of duplicate opposing cutters alternately operating upon the work would permit a tool feed for each stroke of the tool slide with a resulting increase in the time for finishing the work but as herein provided, the use of two different kinds of cutting tools, one for making a roughing cut and the second for making a finishing cut, on an alternate stroke previous to a subsequent work penetrating feed, materially increases the productive capacity of the machine. In the employment of the particular roughing tool herein illustrated, in which the cutter contour or edge is corrugated or undulating, a deeper cut can be made without straining the machine or injury to the tools as only a portion of its tool area penetrates the work, leaving a series of ridges to be removed by the second cutter, thus reducing the cutting area for the second cutter following on the alternate stroke of the slide. This avoids chipping the work at its edges which is of advantage especially in cutting cast iron gears, producing a highly finished product.

*Head-stock or work-holder.*

The head-stock or work-holder is principally illustrated in Figs. 1 and 2, consisting of a frame 75 rigidly fixed to the main frame or body 2, and supporting one end of a work-holding arbor 76, concentrically fitting and non-rotatively clamped within a tubular bushing 77, supported within suitable bearings in the head-stock. The bushing qualifies as a shaft for rotating the arbor and the work in an indexing or work-shifting performance. The arbor has a tapering portion 78 fitting into a correspondingly tapered bore of the bushing 77 at one end thereof and connects with a clamping rod 79 concentrically within the bushing screw threaded into the end of the arbor. The clamping rod 79 projects through the bushing and shoulder to engage the end of the bushing as an abutment for drawing the tapered portion of the arbor longitudinally into the bushing to rigidly clamp the members together. The work 80 is suitably clamped upon the arbor and in gear cutting may be comprised of a plural number of gear blanks in adjacent arrangement upon the arbor. The drawings, however, disclose only one gear blank.

The exposed end of the arbor engages with a dead center 81 supported and longitudinally adjustable within the right-angled arm extension 82, of the over-arm 83, secured within and projecting from the head-stock in adjacent parallelism with the work supporting arbor. The arm extension 82 of the over-arm may be adjusted toward and from the head-stock to accommodate for the size of the work and properly support the free end of the arbor.

The bushing or arbor shaft 77 has a worm wheel 84 fixed thereon as an index wheel, in mesh with a worm 85 fixed to a shaft 86, journaled within a box secured to one side of the frame or body 2, which worm rotates the index gear in consecutive periods the distance required by the circular pitch of the gear, or in geometric proportions to meet the various demands in metal cutting.

Transmission devices.

As has been previously described, the toolholder is reciprocated by the crank devices driven from shaft 45, said shaft being connected with suitable gearing in the box 5. From the shaft 45 the transmission devices for intermittently feeding the tool-carriage toward the work are driven. A gear 90, (see Fig. 11), is fixed to the shaft 45 in mesh with a member 91 of a compound gear journaled upon a shaft 92. The second member 93 of the compound gear meshes with a crank gear 94, fixed to shaft 95 suitably journaled and supported within the body of the machine, and said gear carries a crank pin on which the link 96 is pivotally mounted. The opposite end of said link 96 is pivotally connected to a lever arm 97 loosely supported to freely oscillate upon the feed shaft 22, whereby said lever arm is oscillated upon each cycle of gear 94 for rotating said shaft 22 in intermittent or step operations. A pawl 98 is fulcrumed upon the lever arm 97 and engages with a ratchet wheel 99 fixed to the feed shaft 22. The pawl 98 has a pintle rod 100 projected therefrom as an axis for the pawl which journals and is supported within the lever arm 97. As shown in Figs. 14 and 17, it is notched to receive the plunger 101 embedded within the arm 97 and urged toward the axis of the pintle by a spring 102 serving as tension means for urging the pawl toward the ratchet wheel 99. A pin 103 provides a stop for limiting the movement of the pawl away from the ratchet wheel. Adjacent the pawl and loose upon the feed shaft 22, I provide a hand-operated cam disk 104 as means for regulating the pawl feed by varying the degree of pawl engagement with its ratchet within the predetermined stroke of the link 96. The cam disk 104 swings about the shaft 22 as its axis with its cam portion of a radius sufficient when peripherally engaged by the pawl 98 to sustain the pawl away from its ratchet wheel engagement until the pawl moves off the periphery of the cam. The ends of the cam are rounded or inclined to guide and swing the pawl when it engages therewith away from its ratchet tooth engagement. The cam can be set to various positions for changing the degree of motion of the feed shaft 22 relatively to the maximum movement of the pawl or the cam can be adjusted to entirely cut out the pawl and ratchet engagement.

The cam disk has a hand-hold 105 secured and projected therefrom provided with a catch element adapted to interlock with the toothed edge of the slot 106, formed in the gear casing 107, fixed to the main body 2, the slot accommodating for the maximum arc of cam adjustment required. Thus the cam 28 and its shaft are intermittently rotated through the elements 22—23—25 in a proper predetermined degree for moving the tool carriage toward and from the work.

After an advancing or feeding period of the tool carriage the feed cam is accelerated for a quick return of the tool carriage or for increasing its rotation during an inactive cam interval to rapidly advance the same for a successive feeding operation. For such accelerated motion of the feed cam, I provide a second transmitting train, independent of the intermittent motion imparting devices, which is automatically controlled sequentially in the feed control of the tool carriage. The feed shaft 22 for this latter purpose has a worm pinion 108 concentrically fixed thereon within the casing 107. The worm pinion 108 meshes with a worm wheel 109, suitably journaled and supported within the casing 107 and fixed to a shaft 110. Upon one end of said shaft 110, a gear 111 is fixed, which meshes with a gear 112 journaled within the cap or cover 113, of the casing 107, (see Fig. 12) by means of a tubular hub projection 114. A stud 115 is concentrically supported within the hub of the gear 112 and projects through the same, one end of which, that innermost of the casing, is provided with a cam disk 116 integral with the stud and adapted to be clamped rigidly to the gear 112 by the clamping collar 117, keyed upon the stud 115, and engaging with the end of the tubular hub 114 and secured fast thereto by a nut 118 and screw threaded upon the end of the stud 115. The periphery of the cam engages the roller of a spring actuated plunger 119 slidably mounted within a bearing boss of the casing 107, (see Fig. 15) to urge the same in one direction for controlling a friction clutch member. The clutch arm 120 is concentrically mounted upon the plunger 119 and moves therewith for clutch control. The clutch arm is independently adjustable axially upon the plunger 119 for regulating the tension of a spring 121, interposed between rigid boss of the frame 107 and clutch arm. The plunger is slotted to receive a pin 122, engaged with the clutch arm, said pin being likewise fixed to a rod 123, concentric within said plunger 119 and longitudinally movable therein by the nuts 124, screw threaded upon the end of the rod and engaging with the end of the plunger 119. Thus the clutch arm may be longitudinally translated upon the plunger to any degree required for regulating the tension of the spring 121. The opposite end of the clutch arm 120 is bifurcated to engage into an annular groove of the friction clutch member 125, splined upon a shaft 126, journaled within the casing 107 longitudinally in parallelism with the feed shaft 22. This shaft 126 has a second clutch member 127, loose thereon, adapted to be engaged with the movable clutch member 125. The friction clutch member 127 has a sprocket wheel 128 fixed thereon, which receives a sprocket chain 129 connecting with a driving sprocket 130 upon a shaft 131 supported within the body of the machine, (see Fig. 11). The sprocket wheel 130 is driven by a gear 132, meshing with gear 133, which in turn meshes with a gear 134, receiving its motion from transmitting elements within the transmission box 5. This transmission train revolves the intermediate shaft 126 at an accelerated motion when the clutch members 125 and 127 are frictionally united. The shaft 126 is provided with a sprocket wheel 135 fixed thereon and engaged by a sprocket chain 136 at one end of its loop, its opposite loop end being engaged over a sprocket wheel 137 fixed to the feed shaft 22 completing the driving train between the shaft 126 and the feed shaft 22. The shaft 22 by this accelerated motion transmission is rotated in the same direction as that imparted to it by the ratchet feeding devices, which, therefore, does not interfere therewith, and continues in operation non-effectively, however, because the ratchet wheel is driven at a higher rate of speed, being connected rigidly to the feed shaft 22. The intermittent feeding devices and accelerated motion controlling devices by means of cam and gearing are time-controlled coördinately within a controlling cycle of the feed cam 28, so that after the forward feeding interval of the tool carriage, the cam disk 116 engages with the plunger 119 moving the same radially therefrom and simultaneously therewith, brings the clutch member 125 into frictional engagement with its companion clutch member for accelerating the non-feeding interval of the shaft 22 within a timed portion of the cam and plunger engagement, and as soon as the plunger is released the spring 121 automatically releases the clutch elements and without interruption progressively continues the intermittent ratchet feed for a successive sequence of tool carriage advance toward the work.

The cam disk 116 coöperates with a coincident cam projection 138, integrally projecting from the gear 112 and is rotatably adjustable for regulating or adjusting the effective circumferential contour of the combined parts 116 and 138 for plunger actuation. The rotary adjustment of the cam disk 116 relatively to the non-adjustable cam projection 138 increases or decreases the continuity of a circumferential cam area.

*Work indexing devices.*

For gear cutting machines, the work-holding arbor is intermittently rotated a predetermined degree after each tooth cutting sequence, to position the work for a subsequent operation and at a proper time-controlled sequence relative to the movements of the cutting tools.

In the construction herein illustrated, the indexing devices are locked against rotation during a cutting period, which locking mechanism is automatically controlled. The indexing gear 84, connecting with the work-holding arbor, receives its motion from shaft 126, likewise utilized for imparting the accelerated retreating motion to the tool carriage and the drive is clutch-controlled by the worm wheel 109, which is also utilized for controlling the friction clutch devices heretofore described. A shaft 140 is supported and journaled within the casing 107, coaxially with the shaft 126 with which it connects by clutch devices. These clutch devices comprise a toothed clutch member 141 fixed to the shaft 140 and yieldingly movable thereon longitudinally to accommodate for excessive clutch movements in coupling the shafts. A second tooth clutch member 142 is splined upon the shaft 126 and movable toward and into engagement with the clutch member 141, by means of a forked bell crank lever 143, which engages into an annular groove in said clutch member 142, following the well recognized practice of connecting sliding and rotative members. One arm of said bell crank lever 143 projects toward the worm wheel 109 and is provided with a roller adapted to be engaged by a pin 144, projected transversely therefrom to rock said lever 143, upon its axis 145, for moving said clutch member 142 into coupling engagement with the clutch member 141, for rotatively uniting shafts 126 and 140. The bell crank lever 143 is also utilized for controlling the locking devices for locking the indexing mechanism against rotation, which means will be presently described. The shaft 140 is provided with a gear 146 in mesh with an intermediate gear 146ª as a change gear adjustably mounted upon a swinging quadrant 147, swinging about the axis of a shaft 148, for imparting motion to the indexing gear 84. The change gear 146ª meshes with gear 149 fixed upon the shaft 148, which completes the transmitting train to said shaft. The shaft 148 is connected with the shaft 86 by a universal or flexible coupling 150, which enables the shaft 86 and its bearing to be adjusted toward and from the index wheel axis for a proper mesh of the worm wheel and worm pinion, 84 and 85 respectively, to take up for lost motion between the gear teeth, so that the tooth spacing of the gear to be cut will not vary from the predetermined amount.

The shaft 86 is journaled within the box support 151 suitably secured to the body or bed of the machine, and is adjustable toward and from the index wheel axis. Means are provided for limiting the degree of adjustment so as not to produce a binding intermesh between the teeth radially, as shown in Fig. 16, comprising an angle plate 152, seating within a filling block 153, which supports the shaft journal 151 and pinned to said shaft journal. The flange of said angle piece 152 has a set screw 154 projected therefrom engaging with the flange of said filling block.

To lock the indexing devices against rotation, I provide a recessed disk 155 fixed upon the shaft 140, its recess or notch 156 adapted to be engaged by a tooth projecting from the plunger 157 slidably mounted yieldingly within the casing 107, (see Fig. 13) and urged toward the axis of said disk by a spring 158. A second arm of the bell crank lever 143 engages into an aperture 159 in said plunger for raising the same out of toothed mesh with said lock disk 155, during an indexing sequence, the plunger automatically moving into its locking position.

After a cutting sequence and during the cutting tool retreating motion, the worm wheel 109 in its cycle engages its pin 144, with the lever 143, coupling the shafts 126, 140 and before such coupling raises the lock plunger, so as to disengage from the disk 155, leaving the shaft 140 free to rotate as soon as the clutch elements are engaged. The shaft 140 continues its rotation for a proper time period, the clutching elements being retained in coupling position by the lock disk 155, holding the bell crank lever 143, in clutching position, by reason of the plunger peripheral engagement with the lock disk 155, requiring a complete revolution of said disk before the plunger is again permitted to engage into the disk recess 156. This provides a proper timing for the indexing functioning with the parts automatically controlled.

General operation.

Assuming the work is clamped on the work-holding arbor and the different coöperating devices adjusted relative to the particular class of work to be performed; the carriage 30 is fed intermittently toward the work through the ratchet mechanism, shaft 22, worm pinion 23, worm wheel 25, cam shaft 26 and cam 28 coöperating with the roller 29. Between each intermittent feed of the carriage the roughing tool 66 engages the work during one stroke of the ram to make a roughing cut and the finishing tool 67 engages the work on the return stroke to make a finishing cut. This sequence of intermittent feed, roughing cut and finishing cut is repeated until the cut is of the required depth at which time a concentric portion of the cam 28 engages the roller 29 during a predetermined number of ram strokes utilized for putting a final polish on the work.

At this time the cam 116 engages the plunger 119 to engage the clutch members 125—127 to provide a direct accelerated drive for the shaft 22, through the sprockets 135—137 and chain 136. This provides a fast continuous rotation of the feed cam 28 for retracting the carriage 30, and the tools from the work.

At the limit of the fast reverse feed of the carriage 30, the roller 29 thereof engages the reduced concentric portion of the cam 28 and for a short period said cam is non-effective. During this non-effective period the indexing mechanism functions as follows: The roller 144 on the worm wheel 109 engages the bell crank 143, thereby retracting the lock plunger 157 from the disk 155, and engaging the clutch members 142—141 to drive the index worm wheel 84 through the worm pinion 85, shaft 148, change gears 146—146ᵃ—149 and shaft 140. When the disk 155 has made one complete revolution, the lock plunger 157 automatically reënters the notch therein and rocks the bell crank 143 to disengage the indexing drive and lock the work arbor in indexed position.

The cam 138 now releases the clutch plunger 119 to disconnect the fast direct drive of the feed shaft 22 and the ratchet feed thereof automatically refunctions to produce the above described intermittent feed for a second cutting operation.

Having described the invention, I claim as new and desire to secure by Letters Patent of the United States:—

1. In a machine of the class described, a support, a reciprocating member thereon, a tool-holder mounted upon said member, and a cutting tool secured upon the holder longitudinally with the direction of motion of said member, said tool-holder being pivoted intermediate the opposing ends of the tool and independently movable to translate said tool ends in opposite directions transversely relative to the direction of cutting motion.

2. In a machine of the class described, a support, a reciprocating member thereon, a tool-holder mounted upon said member, a cutting tool having a longitudinal cutter portion contoured coincident with its cutting edge and secured upon said tool-holder correspondingly with the cutting plane, said tool-holder being pivoted intermediate the opposing ends of the tool and independently movable to translate said tool ends in opposite directions transversely relative to the direction of cutting motion.

3. In a machine of the class described, a main supporting frame, a work-holder, a tool-holder supporting member slidable upon said frame toward and from said work-holder, a tool-holder reciprocated upon said supporting member, and rotary means engaging said supporting member for moving said member intermittently in one direction and uniformly in a reverse.

4. In a machine of the class described, a base frame, a work-holder thereon, a carriage mounted upon said frame movable toward and from the work, a sub-carriage movably mounted upon said frame interveningly between said carriage and work-holder, and means on said carriage for translating said sub-carriage intermittently toward and uniformly from the work.

5. In a machine of the class described, a bed, a work-holder thereon, a carriage upon said bed movable toward and from the work, a second carriage movable upon said bed unitarily with the first-named carriage and independently thereof in motions of reciprocation toward and from the work, means carried by said first carriage for intermittently reciprocating the second at varying stroke speeds for a forward tool feed and uniformly at an accelerated speed for a reverse tool feed, and a cutting tool mounted upon said second carriage and movable across the work.

6. In a machine of the class described, a bed, a work-holder support rigid thereon, a rotatable arbor journaled in said support, means for rotatively propelling said arbor intermittently in predetermined divisional degrees of arbor cycle and in appropriate sequence, a carriage stationed upon said bed and adapted to be moved thereon transversely to the arbor axis, a second carriage upon said bed unitarily movable with said first carriage, and independently within predetermined tool feed limits, propelling devices carried by said first carriage for intermittently moving the second in one direction, an independent constant drive for said propelling devices for moving the second carriage in a reverse direction, a cutting tool supported upon said second carriage movable therewith and independently in a direction parallel with the arbor across the work.

7. In a machine of the class described, a bed, a work-holder support rigid thereon, a rotatable arbor journaled in said support, means for rotatively propelling said arbor intermittently in predetermined divisional degrees of arbor cycle and in appropriate sequence, releasable means for locking said rotative element in their dormant periods, a carriage upon said bed and movable thereon transversely to the arbor axis, a second carriage upon said bed unitarily movable with said first carriage and independently movable for limited tool feed motions, propelling devices carried by said first carriage for independently moving the second in motion of alternate, intermittent and uniform reciprocation and in alternate variable speeds, a cutting tool supported upon said second carriage movable therewith and independently across the work.

8. In a machine of the class described, a bed, a work-holder thereon, an arbor within said holder intermittently rotative in divisional degrees of arbor cycle, a tool carriage translatable upon said bed in different motions of reciprocation transversely to said arbor axis, a first shaft for propelling said carriage, propelling devices connecting with said shaft for intermittently rotating the same, a second and third shaft axially alined, the second transmittingly connecting with said first shaft for rotating the latter in a timed sequence at a constant rate, the third shaft connecting through indexing gearing with said arbor, clutching devices for connecting said second and third shafts, clutch controlling devices therefor, receiving motion through said first shaft, power means for rotating said second shaft, clutching devices for connecting said means and shaft, and clutch controlling devices therefor receiving motion through said first shaft.

9. In a machine of the class described, a base, a tool carriage translatable on the base in differential motions of reciprocation, a work arbor journaled on the base, intermittently rotative in divisional degrees of arbor cycle, carriage feed devices, an intermittent and an independent constant drive therefor, means for rotating the arbor functioning intermediate the constant and a subsequent intermittent carriage feed drive.

10. In a machine of the class described, a base, a work arbor, a carriage slidable on the base, a reciprocating tool support on the carriage, a cutting tool carried thereby, intermittently operated feed means for first advancing the carriage toward the work arbor to a predetermined limit and subsequently holding the carriage at said limit during a plurality of tool strokes, and means for continuously operating said feed means for retracting the carriage.

11. In a machine of the class described, a base, a work arbor, a carriage slidable on the base, a reciprocating tool support on the carriage, a cutting tool carried thereby, intermittently operated feed means for first advancing the carriage toward the work arbor to a predetermined limit and subsequently holding the carriage at said limit during a plurality of tool strokes, means for continuously operating said feed means for retracting the carriage, and means for varying the degree of each intermittent operation of the feed means.

12. In a machine of the class described, a base, a work arbor, a carriage slidable on the base, a reciprocating tool support on the carriage, a cutting tool carried thereby, intermittently operated feed means for first advancing the carriage toward the work arbor at alternate tool strokes to a predetermined limit and subsequently holding the carriage at said limit during a plurality of tool strokes, and means for continuously operating said feed means for retracting the carriage.

13. In a machine of the class described, a base, a work arbor, a carriage slidable on the base, a reciprocating tool support on the carriage, a cutting tool carried thereby, intermittently operated feed means for first advancing the carriage toward the work arbor at alternate tool strokes to a predetermined limit and subsequently holding the carriage at said limit during a plurality of tool strokes, means for continuously operating said feed means for retracting the carriage, and means for varying the degree of each intermittent operation of the feed means.

14. In a machine of the class described, a base, a work arbor, a carriage slidable on the base, a reciprocating tool support on the carriage, a cutting tool carried thereby, intermittently operated feed means for first advancing the carriage toward the work arbor to a predetermined limit and subsequently holding the carriage at said limit during a plurality of tool strokes, and clutch controlled means for continuously operating said feed means for retracting the carriage.

15. In a machine of the class described, a base, a work arbor, a carriage slidable on the base, a reciprocating tool support on the carriage, a cutting tool carried thereby, intermittently operated feed means for first advancing the carriage toward the work arbor to a predetermined limit and subsequently holding the carriage at said limit during a plurality of tool strokes, means for continuously operating said feed means for retracting the carriage, a clutch device therefor, and means for variably controlling the clutch device.

In witness whereof, I hereunto subscribe my name, as attested by the two subscribing witnesses.

GEORGE A. SCHIPPER.

Witnesses:
GEORGE M. STEDMAN,
WILLARD M. DEAN.